United States Patent [19]

Inatsune et al.

[11] Patent Number: 4,947,176
[45] Date of Patent: Aug. 7, 1990

[54] MULTIPLE-BEAM ANTENNA SYSTEM

[75] Inventors: Shigeho Inatsune; Yoshimasa Ohashi; Takahiko Fujisaka; Michimasa Kondo, all of Kanagawa, Japan

[73] Assignee: Mitsubishi Denki Kabushiki Kaisha, Tokyo, Japan

[21] Appl. No.: 363,490

[22] Filed: Jun. 8, 1989

[30] Foreign Application Priority Data

Jun. 10, 1988 [JP] Japan .................................. 1-144301
Feb. 3, 1989 [JP] Japan .................................. 63-25101

[51] Int. Cl.$^5$ .............................................. G01S 13/00
[52] U.S. Cl. .................................... 342/173; 342/165
[58] Field of Search ................ 342/368, 371, 372, 373, 342/378, 165, 173, 174

[56] References Cited

U.S. PATENT DOCUMENTS

| 4,532,518 | 7/1985 | Gaglione et al. | 342/372 |
| 4,656,479 | 4/1987 | Kirimoto et al. | |
| 4,825,213 | 4/1989 | Smrek | 342/25 |
| 4,866,449 | 9/1989 | Gaffney | 342/94 |

OTHER PUBLICATIONS

"Digital Multiple Beamforming Techniques for Radar", A. E. Ruvin, L. Weinberg, IEEE EASCON-78, pp. 152-163.
"Applying Superresolution to Circular Arrays", U. Petri, Pedro de la Fuente, IEEE ISAP '87, pp. 882-885.
"A Multiple Beam Forming Algorithm of the Circular Array Antenna", 2nd Digital Signal Processing Symposium, Dec. 11 & 12, 1987, pp. 151-155.

Primary Examiner—Thomas H. Tarcza
Assistant Examiner—Mark Hellner
Attorney, Agent, or Firm—Wolf, Greenfield & Sacks

[57] ABSTRACT

A multiple-beam antenna system capable of forming a plurality of beams at one time in different directions. The antenna system has a plurality of element antennas arranged in a predetermined configuration. A signal received by each element antenna is converted to a digital signal which in turn is subjected to a Fourier transform. The Fourier-transformed receiving signal is multiplied with a Fourier-transformed weighting function. The resultant product is subjected to an inverse Fourier transform to be used for calculating an antenna radiation pattern. A holographic multiple-beam antenna is also disclosed.

7 Claims, 11 Drawing Sheets

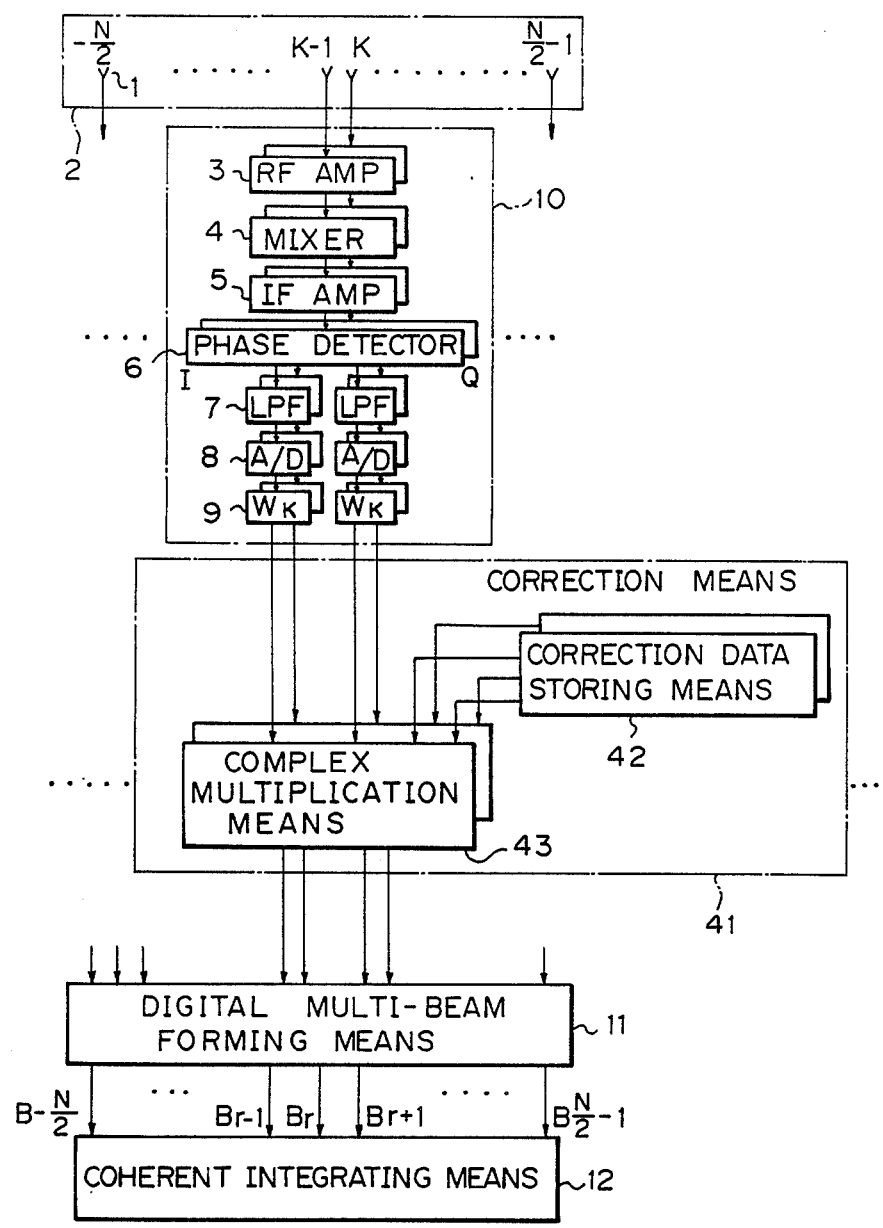

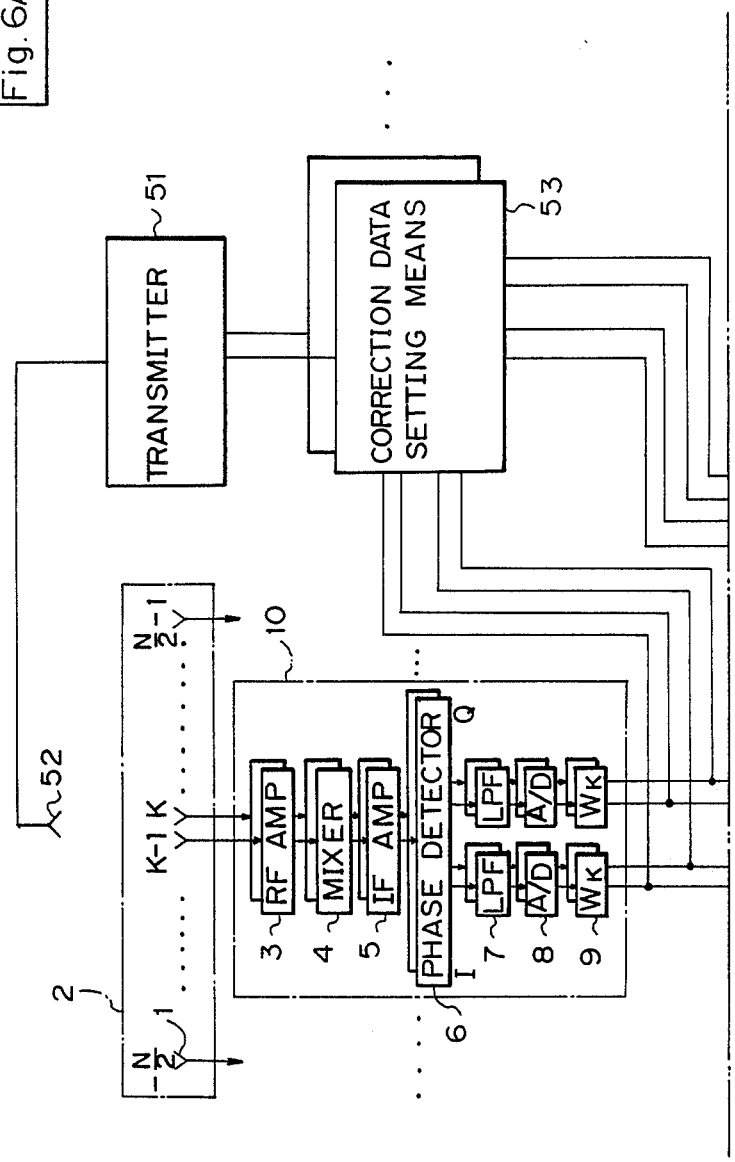

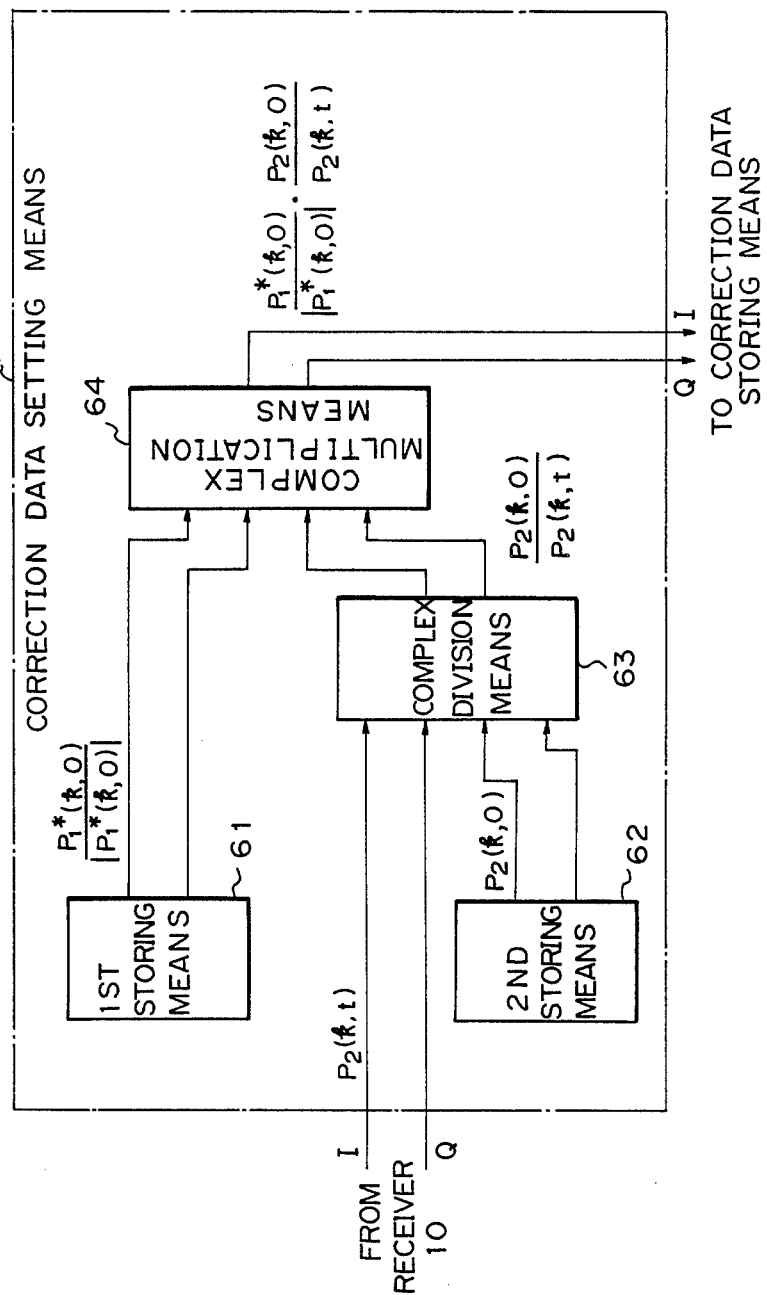

MULTIPLE-BEAM ANTENNA SYSTEM

BACKGROUND OF THE INVENTION

1. Field of Invention

The present invention relates to a multiple-beam antenna system having a plurality of element antennas disposed in the configuration of a circle, a cylinder or a straight line to form a plurality of beams at one time. For example, the present invention relates to a holographic multiple-beam antenna system capable of forming multiple beams by using complex video signals each including amplitude information and phase information obtained by a receiver connected to the element antennas.

2. Prior Art

FIG. 1A shows an example of a conventional array antenna system as disclosed in a book entitled "Antenna Engineering" written by Keiji Endo et al. and published by Nikkan Kogyo Shimbun-sha in 1969. In FIG. 1A, the reference signals A1, A2, ..., AN each designate an element antenna arranged at regular intervals around a circle having the diameter D. As shown in this figure, assuming that the main beam arrives at an angle $\Phi$ and that the observation point is located at an angle $\phi$ relative to the direction of the main beam, each of N element antennas A1, A2, ..., AN has a phase expressed by the following equation:

$$-\frac{\pi D}{\lambda} \cos\left(\frac{2\pi k}{N} - \Phi\right) \tag{1}$$

where $\lambda$ is the wavelength of a transmitted wave; k=1, 2, ..., N in correspondence with element antennas A1, A2, ..., AN. If the radiation pattern of the respective element antennas is uniform, that is, omnidirectional, and the amplitude of an exciting current applied to each of the element antennas is the same, the composite directional pattern $E(\Phi)$ is expressed as follows:

$$E(\phi) = \frac{1}{N} \sum_{k=1}^{N} \exp\left[j\frac{\pi D}{\lambda}\left\{\cos\left(\frac{2\pi k}{N} - \phi - \Phi\right) - \cos\left(\frac{2\pi k}{N} - \Phi\right)\right\}\right] \tag{2}$$

FIG. 1B shows a composite directional pattern $E(\Phi)$ when $\Phi=0$, $D=2\lambda$, $N=6, 8, 16$ and $\infty$ are used in equation (2).

The above description concerns the case of transmission, but a similar discussion could be made for the case of reception.

Being constructed in the manner described above, the conventional array antenna system needs to steer the main beam by giving the element antennas a phase as expressed by equation (1), in order to allow a plurality of beams arriving at the antenna system from various directions to be received at one time. This means that the conventional array antenna system is incapable of receiving a plurality of beams of radio waves simultaneously.

Accordingly, there has been a desire for a multiple-beam antenna system which can form a plurality of main beams at one time so as to allow the antenna system to simultaneously receive a plurality of radio waves impinging thereto. For example, an algorithm has been proposed to allow a circular array antenna to form a plurality of beams at the same time. Such an algorithm will be explained with reference to FIGS. 2A-2C.

In FIG. 2A, N antennas are disposed at intervals represented by an equal angle $\Delta\theta$ $[=\pi/(N-1)]$ on a semicircle having the diameter $a$. Assuming that a radio wave comes to the antenna in the direction $\psi$, a signal received by the $\gamma$-th element antenna is expressed as follows:

$$S_\gamma(\psi) = \exp\left\{j\frac{2\pi a}{\lambda} \cos(\psi - \gamma \cdot \Delta\theta)\right\} \tag{3}$$

where $\lambda$ is the wavelength of the incoming radio wave, and $\gamma = 0, 1, 2, \ldots, N-1$.

Then, a weighting function $T_\gamma$ shown below is multiplied by the signal received by the $\gamma$-th element antenna and expressed in equation (3):

$$T_\gamma = W_\gamma \cdot \exp\left\{j\frac{2\pi a}{\lambda} \cos\left(\gamma \cdot \Delta\theta - \frac{M-1}{2} \cdot \Delta\theta\right)\right\} \tag{4}$$

where $\gamma = 0, 1, 2, \ldots, M-1$. M is the number of element antennas which contribute to the formation of the beams, and can be arbitrarily decided. Accordingly, $$T_\gamma = 0$$

when $\gamma$ is larger than M. In equation (4), $W_\gamma$ is a window function such as a Hamming function and a Hunning function.

The antenna radiation pattern at this time $E_k(\psi)$ is given by the following equation:

$$E_k(\psi) = \sum_{\gamma=k}^{Q+k-1} S_\gamma(\psi) \cdot T_{\gamma-k} = \sum_{\gamma=0}^{Q-1} S_{\gamma+k}(\psi) \cdot T_\gamma \tag{5}$$

where $k=0, 1, 2, \ldots, Q-1$; and $Q \geq N+M-1$. In equation (5) $S_\gamma=0$ in a case where $\gamma$ is equal to or larger than N. Equation (5) takes a form of the convolution integration of $S_\gamma(\psi)$ and $T_{-\gamma}$, and thus the Fourier transforms $X_p$ and $Y_p$ of $S_\gamma(\psi)$ and $T_{-\gamma}$, respectively, are expressed as follows:

$$X_p = \sum_{\gamma=0}^{Q-1} S_\gamma(\psi) \exp\left(-j\frac{2\pi\gamma p}{Q}\right) \tag{6}$$

$$Y_p = \sum_{\gamma=0}^{Q-1} T_{-\gamma} \exp\left(-j\frac{2\pi\gamma p}{Q}\right) \tag{7}$$

This means that antenna radiation pattern $E_k(\psi)$ may be given by first obtaining the above-described $X_p$ and $Y_p$ and then performing inverse Fourier transform of $X_p$ and $Y_p$. In other words, antenna radiation pattern $E_k(\psi)$ is expressed by the following equation:

$$Z_p = X_p Y_p \tag{8}$$

-continued $$E_k(\psi) = \sum_{p=0}^{Q-1} Z_p \cdot \exp\left(j\frac{2\pi pk}{Q}\right) \quad (9)$$

It is possible to speed up Fourier transform and inverse Fourier transform by using FFT (Fast Fourier Transform) or IFFT (Inverse Fast Fourier Transform).

FIG. 2B shows an example of beams formed at the same time in twelve equiangular directions when the window function is the Taylor 35 dB and N=42, M=11, $\Delta\theta=\pi/21$ and $a=4.58\ \lambda$.

The above-described algorithm for forming multiple beams can be achieved by utilizing a flowchart such as that shown in FIG. 2C. In step S1, received signal $S_\gamma$ is Fourier-transformed to obtain $X_p$ by using equation (6). Then in step S2, weighting function $T_\gamma$ to be multiplied by the received signal is Fourier-transformed to obtain $Y_p$ by using equation (7). The thus obtained $X_p$ and $Y_p$ are multiplied in step S3 to obtain product $Z_p$ [equation (8)]. Step S4 performs inverse Fourier transform of $Z_p$ to obtain antenna radiation pattern $E_k(\psi)$ as expressed by equation (9).

As for Fourier transform of antenna outputs, the article "Applying Superresolution to Circular Arrays" written by Ulrich Petri and Pedro de la Fuente and appearing at pages 882–885 in IEEE ISAP '87 discloses a Fourier transform technique applied to outputs from respective element antennas arranged on a circle.

A digital beam forming technique is also known. For example, U.S. Pat. No. 4,656,479 discloses that the outputs from receivers each connected to a corresponding one of a plurality of element antennas are converted to digital signals which in turn are used to form beams by digital calculation. Such a digital beam forming technique is used in a holographic multiple-beam antenna system, as referred to in the article "Digital Multiple Beamforming Techniques for Radars" written by Abraham Rubin and Leonard Weinberg and appearing at pages 152–163 in EASCON-78 (IEEE, EASCON-78).

The main portion of such an antenna system is shown schematically in FIG. 3A. In this figure, N element antennas 1 form an antenna array 2. Each element antenna 1 is connected to RF amplifier 3 which amplifies an RF signal received by a corresponding element antenna. The amplified RF signal is converted to an IF signal by mixer 4. The IF signal output from mixer 4 is amplified by IF amplifier 5 and supplied to phase detector 6 which includes a coherent oscillator capable of generating a coherent signal as a reference signal. Phase detector 6 operates to perform the phase detection of the IF signal while reserving the phase of the IF signal, and converts the IF signal to a baseband complex video signal composed of amplitude information and phase information. The I (in-phase) channel and Q (quadrature) channel outputs of phase detector 6 respectively pass through low pass filters 7 and are input to A/D converters 8 where the baseband complex video signal is converted to a digital signal. The digitized complex video signals are each input to output level adjusters 9 which are operable to weight the digital complex video signal in order to reduce the side lobe level during beamforming.

N receivers 10 each including RF amplifier 3, mixer 4, IF amplifier 5, phase detector 6, low pass filter 7, A/D converters 8 and output level adjusters 9 are provided in correspondence with the respective element antennas.

The signals output from receivers 10 connected to element antennas 1 are processed in a digital manner in digital multiple-beam forming means 11 to form a multiplicity of beams the number of which corresponds to the number of element antennas. Coherent integrating means 12 performs coherent integration of the respective beams formed for a predetermined period of time by digital multiple-beam forming means 11.

An operation of the holographic multiple-beam antenna system shown in FIG. 3A will be explained below. An RF signal received by each of N element antennas is input to a corresponding receiver 10, amplified by RF amplifier 3, converted to an IF signal by mixer 4 and amplified by IF amplifier 5. This IF signal is phase-detected by phase detector 6 and converted to a complex video signal comprising I and Q channel signals. The video signal in each channel is then limited in bandwidth by low pass filter 7, converted to a digital video signal by A/D converter 8, weighted so as to reduce the side lobe level in beamforming by output level adjuster 9 and then input to digital multiple-beam forming means 11.

Assume that N element antennas are arranged in the direction parallel to the X coordinate as shown in FIG. 3B, the angle between the direction of the incoming radio wave and the X coordinate being $a$, the distance between the adjacent element antennas being d, and the wavelength being $\lambda$. Then there is the phase difference $2\pi(d\cos a)/\lambda$ between the signals received by the adjacent element antennas. The output of k-th receiver 10, $\sigma(k)$, is input to digital multiple-beam forming means 12 which performs the following calculation:

$$B_r = \sum_{k=-N/2}^{N/2-1} W_k \cdot \sigma(k) \cdot \exp\left(-j\frac{2\pi}{N} \cdot k \cdot r\right) \quad (10)$$

$$r = -N/2, -N/2+1, \ldots, 0, \ldots, N/2 - 1.$$

Such calculation allows the digital multiple-beam forming means 11 to form N beams which have the maximum gain in the direction $a_r = \cos^{-1}(r\lambda/Nd)$. In other words, one RF signal input makes beamforming output Br corresponding to N beams. In equation (10), $W_k$ is a weighting factor given in output level adjuster 9 in receiver 10.

In such a holographic multiple-beam antenna system, the irregularities in the respective element antennas, the components of the receivers and the length of the transmission lines connecting them would produce amplitude and phase differences between the outputs of the respective receivers. This would make it difficult to form accurate beams as expressed by equation (10). Further, a change in temperature would vary the characteristics of receivers and element antennas, which would also bring about amplitude and phase differences.

SUMMARY OF THE INVENTION

It is an object of the invention to provide a multiple-beam antenna system capable of forming a plurality of beams at one time without beam scanning.

To achieve this object, a multiple-beam antenna system according to the present invention includes an antenna array having a plurality of element antennas disposed in a predetermined configuration. Each of the element antennas is connected to a digital conversion means for converting a signal from the corresponding element antenna to a digital signal. The digital signals output from the respective digital conversion means as well as a weighting function are then Fourier-transformed by Fourier transform means. The thus Fourier-transformed digital signals and weighting function are multiplied by each other and the resultant products are subjected to an inverse Fourier transform to allow calculation of an antenna radiation pattern.

In an embodiment of the multiple-beam antenna system according to the present invention, an oscillator is provided for outputting a coherent signal, and each of the digital conversion means comprises; a first phase detector means which receives the signal from the corresponding element antenna and the coherent signal to phase-detect the former by utilizing the latter; a phase shifting means for shifting the phase of the coherent signal by 90 degrees; a second phase detector means which receivers the signal from the corresponding element antenna and the 90 degree-phase shifted coherent signal to phase-detect the former by utilizing the latter; a first A/D conversion means for converting the output of the first phase detector means to a corresponding digital signal; and a second A/D conversion means for converting the output of the second phase detector means to a corresponding digital signal.

Alternatively, a local oscillator is provided for generating a local oscillator frequency signal, and each of the digital conversion means comprises a mixer means for mixing the signal received by the corresponding element antenna with the local oscillator frequency signal to obtain an IF signal, and an A/D conversion means for converting the IF signal from the mixer means to a digital signal.

It is another object of the present invention to provide a holographic multiple-beam antenna system capable of forming a plurality of beams at one time with a higher level of accuracy by reducing the amplitude and/or phase errors that occur in the receiving paths from element antennas to the receivers.

In order to achieve this object, a holographic multiple-beam antenna system according to the present invention comprises an antenna array having a plurality of element antennas. Each of the element antennas is connected to a receiver means which detects the received signal to output a digital complex signal including amplitude information and phase information. Each receiver means is connected to a correction means which corrects the digital complex signal on the basis of correction data preset in accordance with any change in amplitude and/or phase characteristics that have occurred in the receiving path from the element antenna to the receiver. To form a plurality of beams, a multiple-beam forming means receives the digital complex signals output from the respective correction means and from which the amplitude and/or phase errors have been removed. Each of the correction means comprises a memory means for storing the correction data, and a multiplication means for multiplying the digital complex signal from the receiver means by the correction data from the storing means.

In order to set the correction data in the storing means in accordance with a change in the amplitude and/or phase characteristics of the receiving path, a transmitter means is provided for transmitting a test wave to the antenna array at predetermined times. A change in the amplitude and/or phase characteristics of each receiving path is detected using the digital signal output from the receiver when the test signal is received. A setting means is provided for the purpose of causing the correction data corresponding to the detected change to be set in the correction means. The setting means comprises a first memory means for storing the intial value of the correction data, a second memory means for storing a reference value to be used for obtaining a change in the amplitude and/or phase characteristics of the receiving path, division means which divides the reference value by the digital complex signal output from the receiver means to output a complex signal corresponding to the change in amplitude and/or phase characteristics, and a multiplication means which multiplies the initial value of the correction data by the complex signal. The resultant product is output as current correction data to update the correction means.

These and other objects and advantages will become clear by reading the following description of the invention with reference to the accompanied drawings.

BRIEF DESCRIPTION OF THE DRAWINGS

FIG. 1A shows the arrangement of a plurality of element antennas; and FIG. 1B shows the composite directional pattern of the array antenna system shown in FIG. 1A.

FIG. 2A shows the arrangement of a plurality of element antenns; FIG. 2B shows an example of a plurality of beams formed by this algorithm; and FIG. 2C shows a flow chart of steps for executing this algorithm.

FIG. 3A is a block diagram showing the construction thereof; and FIG. 3B shows the relationship between the direction in which a plurality of element antennas are disposed and the direction of a wave incident upon the element antennas.

FIG. 4A is a block diagram showing the construction thereof; FIG. 4B is a block diagram showing the construction of a receiving module shown in FIG. 4A; and FIG. 4C is a block diagram showing the construction of another example of a receiving module in FIG. 4A.

FIG. 5 is a block diagram of the construction of a multiple-beam antenna system according to the present invention, as constructed as a holographic multiple-beam antenna system.

FIGS. 6A and 6B are used to explain still another embodiment of the present invention: FIG. 6A is a block diagram of the construction of an improved holographic multiple-beam antenna system; and FIG. 6B is a block diagram of the construction of the correction data setting means shown in FIG. 6A.

DESCRIPTION OF THE PREFERRED EMBODIMENTS

Figure 4A:
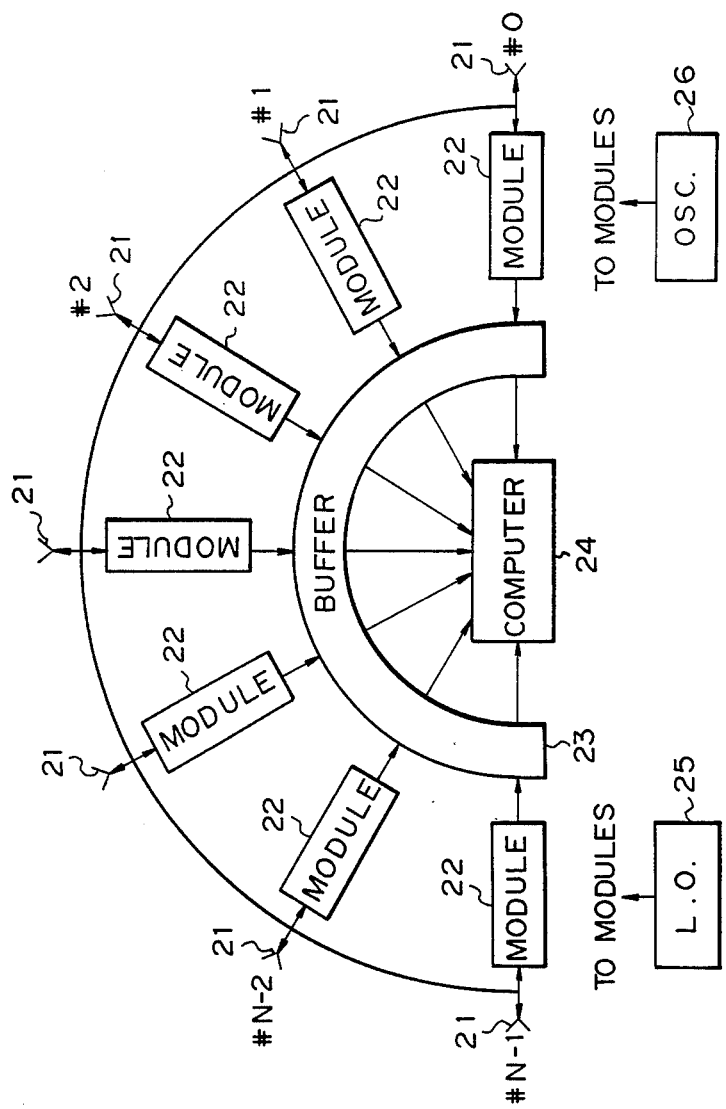
FIGS. 4A–4C are used to explain an embodiment of a multiple-beam antenna system according to the present invention.

FIG. 4A schematically shows a block diagram of an embodiment of a multiple-beam antenna system according to the present invention. This antenna system employs computerized signal processing for the purpose of forming a plurality of beams, which enables a plurality of radio waves to be received at one time without beam scanning.

In this figure, an incident radio wave is received by a number N of element antennas 21 arranged in the form of a circle or a cylinder at regular intervals, and input to N receiving modules 22 each connected to a corresponding element antenna. The output from each receiving module 22 is input through buffer 23 to computer 24.

The respective receiving modules 22 are connected to local oscillator 25 and, if necessary, coherent oscillator 26 to be supplied with a local oscillator frequency signal and a coherent signal, respectively.

Figure 4B:
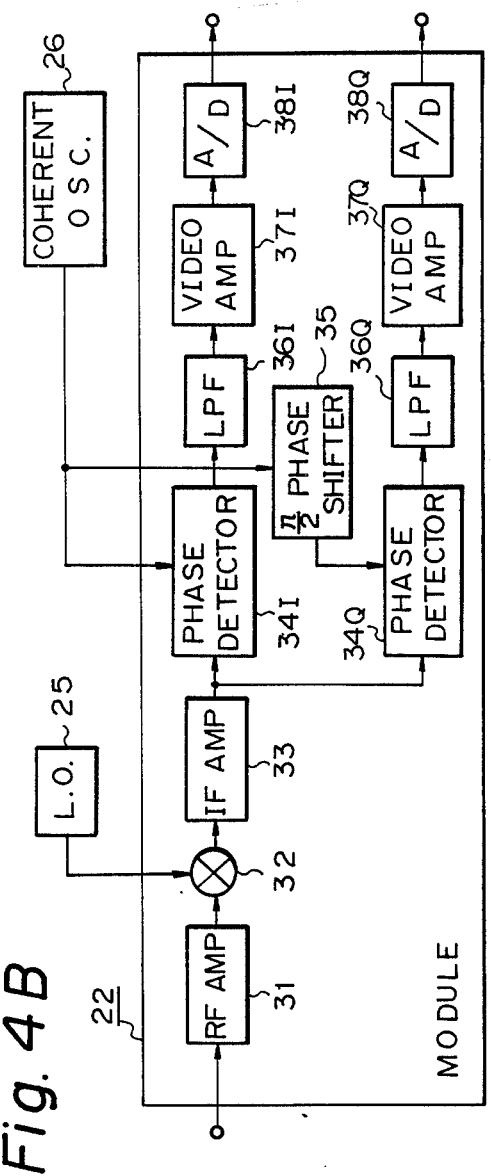

FIG. 4B shows an example of the internal construction of receiving module 22 and the relationship between module 22, local oscillator 25 and coherent oscillator 26. Further, FIG. 4C shows another example of the internal construction of receiving module 22.

In FIG. 4B, a signal input to receiving module 22 is supplied to RF amplifier 31 which in turn amplifies the input signal. The amplified signal is mixed by mixer 32 with a local oscillator frequency signal and converted to an IF signal. The IF signal is amplified by IF amplifier 33 and phase-detected by phase detectors 34I and 34Q by being mixed with a reference signal output from coherent oscillator 26. Thus, video signals are produced. It is noted that the output from coherent oscillator 26 is phase-shifted by $\pi/2$ by phase shifter 35 and applied to Q-channel phase detector 34Q. The outputs from phase detectors 34I and 34Q are fed through low pass filters 36I and 36Q and video amplifiers 37I and 37Q to A/D converters 38I and 38Q where the amplified signals are converted to digital signals.

Figure 4C:
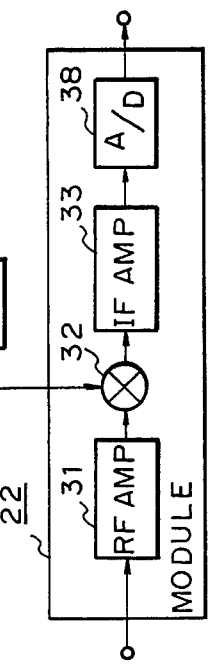

In FIG. 4C, a signal input to receiving module 22 is input to RF amplifier 31 and mixed by mixer 32 with a local oscillator frequency signal from local oscillator 25 to form an IF signal. This IF signal is amplified by IF amplifier 33 and converted to a digital signal by A/D converter 38.

Figure 1A:
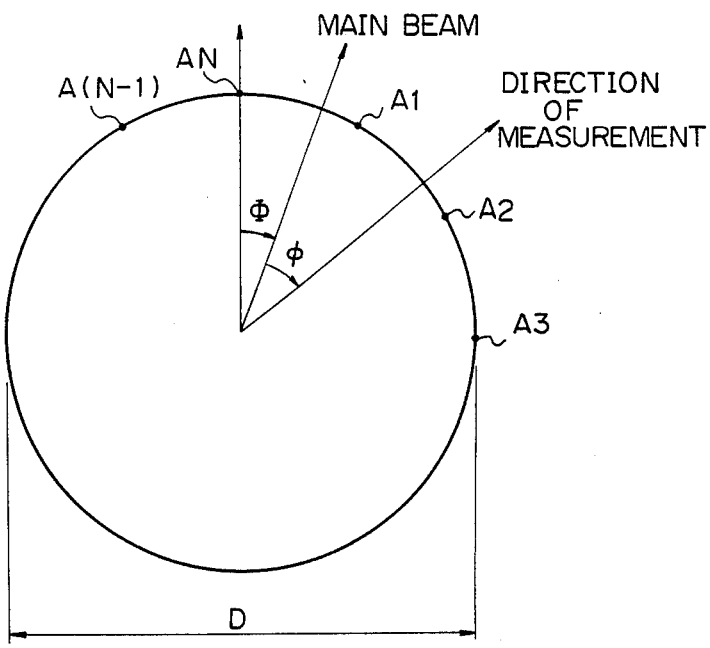
FIGS. 1A and 1B show an example of a conventional array antenna system.
Figure 1B:
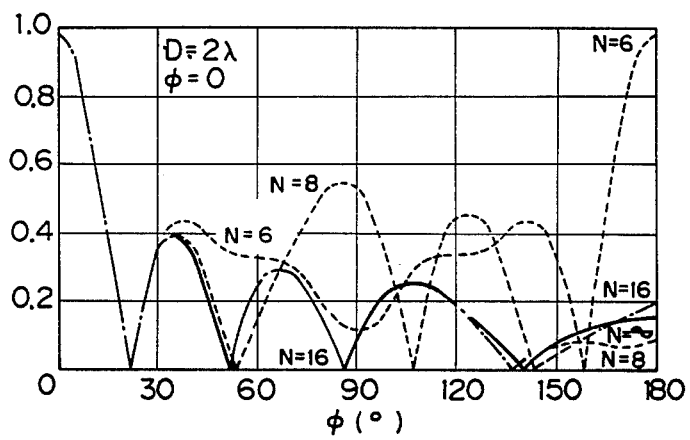
Figure 2A:
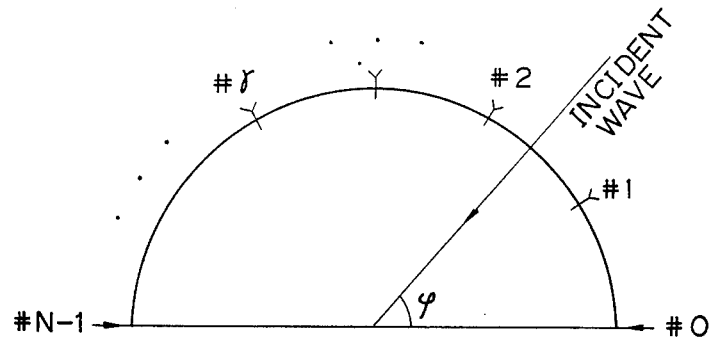
FIGS. 2A–2C are used to explain a known algorithm for forming a plurality of beams at one time by a circular array antennas.
Figure 2C:
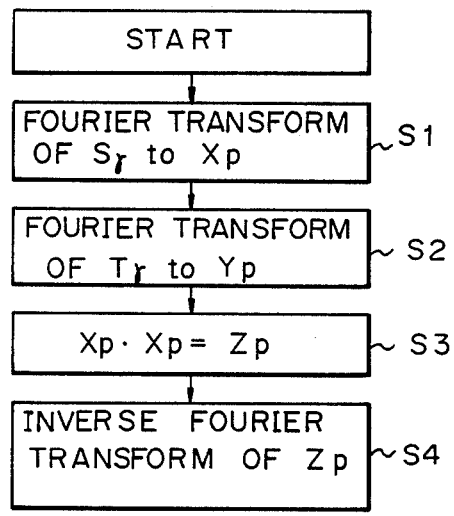
Figure 2B:
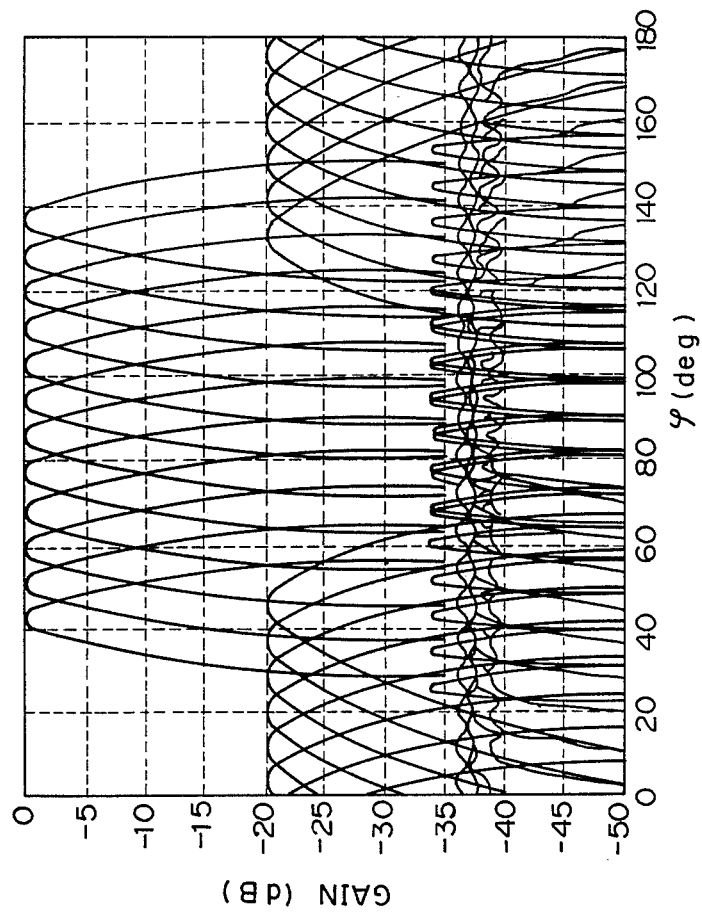

As described above, the received signals are, after being converted to the digital signals by the receiving modules 22, input through buffer 23 to computer 24. Computer 24 is suitably programmed such as to implement operations in accordance with the flow chart shown in FIG. 2C for prosecuting the algorithm for forming multiple beams with a circular array antenna, as already described with reference to FIGS. 2A and 2B.

Figure 3A:
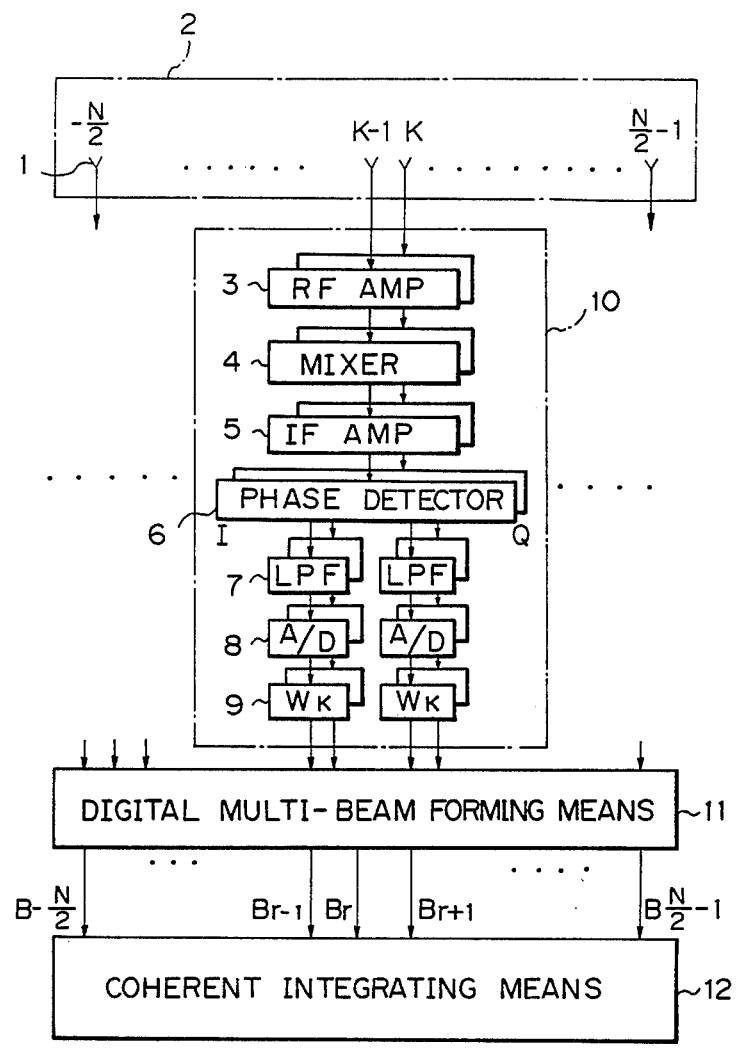
FIGS. 3A and 3B show a conventional holographic multiple-beam antenna system.
Figure 3B:
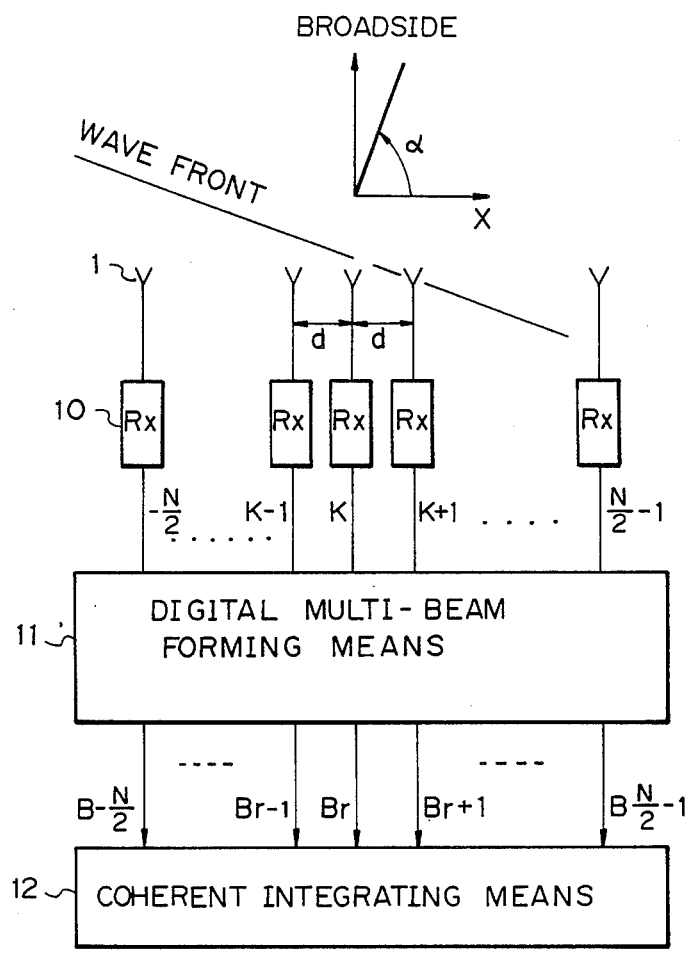

FIG. 5 is a block diagram showing the construction of another embodiment of a multiple-beam antenna system according to the present invention. This embodiment has the object of improving a holographic multiple-beam antenna system as shown in FIG. 3A to form beams of higher accuracy even if amplitude and/or phase errors are found in each receiver output. Accordingly, elements and components similar to those in FIG. 3A are designated by the same reference numerals and, therefore, descriptions of these elements are omitted here.

In FIG. 5, each receiver 10 is connected through a corresponding correction means 41 to digital multiple-beam forming means 11. Correction means 41 are provided to correct the amplitude and/or phase errors of the digital complex radio signals, and each comprises a correction data storing means 42 for storing correction data for correcting the digital complex video signal so as to cancel any amplitude and/or phase errors due to irregularities in the length of the receiving path and the characteristics of parts, and complex multiplication means 43 for multiplying the correction data from correction data storing means 42 by the digital complex video signal to supply the resultant product to digital multiple-beam forming means 11.

In operation, the RF signal is subjected to signal processing such as amplification in each of N receivers 10 and converted to a digital complex video signal. The signal from the k-th receiver is fed to the k-th correction means 41 and multiplied by the correction data from correction data storing means 42. Such multiplication allows the amplitude and/or phase errors due to the irregularities in the receiving path length and characteristics of parts to be cancelled from the digital complex video signal. The thus corrected signal is supplied to digital multiple-beam forming means 11.

In order to obtain the correction data to be stored in correction data storing means 42, the output $\rho_1(k,0)$ from the k-th receiver 10 is obtained when a planar wave impinges on antenna array 2 in the direction perpendicular to the direction in which element antennas 1 are arranged. Then the value $$\rho_1^*(k,0)/|\rho_1^*(k,0)|$$

is calculated on the basis of the obtained $\rho_1(k,0)$ and stored in storing means 42 as correction data corresponding to the k-th receiving path. The sign * indicates a complex conjugate. The planar wave which is perpendicularly incident on antenna array 2 is an RF signal impinging on the respective element antennas in phase. Accordingly, the value $\rho_1^*(k,0)/|\rho_1^*(k,0)|$ when a planar wave comes to antenna array 2 in the normal direction shows the phase reverse to the phase exhibited when the received signal travels from the k-th element antenna to the k-th receiver. Multiplying this value with the received signal $\sigma(k)$ cancels the transmission phase of the k-th receiving path. By executing the same signal processing for all the receiving paths, the transmission phase of the respective receiving paths is cancelled so as to correct the phase errors due to the irregularities in length of the receiving paths.

In this case, the outputs from digital multiple-beam forming means 11 are expressed as follows:

$$B_r = \sum_{k=-N/2}^{N/2-1} W_k \cdot \sigma(k) \frac{\rho_1^*(k,0)}{|\rho_1^*(k,0)|} \cdot \exp\left(-j\left(\frac{2\pi}{N}\right)k \cdot r\right) \quad (11)$$

where $r = -N/2, -N/2+1, \ldots, 0, \ldots, N/2-1$; $B_r$ is the beam forming output in the direction $\alpha = \cos^{-1}(r\lambda/Nd)$; $W_k$ is a weighting coefficient for reducing the sidelobe levels; and $\sigma(k)$ is the output from the k-th receiver. The symbol * indicates that any term given this symbol is a complex conjugate.

As described above, this embodiment ensures accurate beam forming by correcting the irregularity in phase characteristics of each path from the element antenna to the receiver connected thereto.

In addition to the correction of phase errors, amplitude errors may also be corrected by employing a term for correcting such errors. One example of this term is $$1/\sqrt{E[|\rho_1(k, 0)|^2]}.$$

Multiplying this term by output $\sigma(k)$ from the k-th receiver 10 corrects the amplitude error. Function E is used to obtain the average value of the element antenna in the azimuth direction $\theta$.

The multiple-beam forming output when the phase and amplitude errors have been corrected is expressed by the following equation:

$$B_r = \sum_{k=-N/2}^{N/2-1} W_k \cdot \sigma(k) \frac{\rho_1^*(k, 0)}{|\rho_1^*(k, 0)|} \cdot \qquad (12)$$

$$\frac{1}{\sqrt{E[|\rho_1(k, 0)|^2]}} \cdot \exp\left\{-j\left(\frac{2\pi}{N}\right)k \cdot r\right\}$$

Figures 2, 6A:
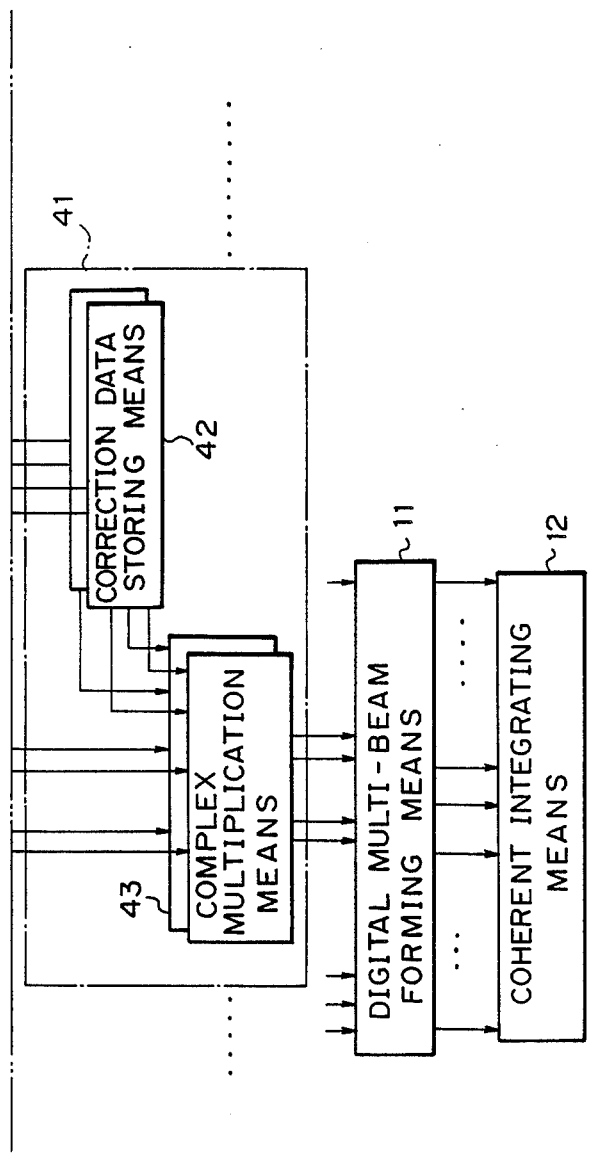

Turning now to FIG. 6A, the construction of still another embodiment of the present invention is shown therein. The same signs are used to designate similar elements and components. In FIG. 6A, in order to detect a change in amplitude and/or the phase characteristics of each receiving path from element antenna 1 to receiver 10 connected thereto, transmitter 51 generates a test wave. The test wave thus generated is transmitted from transmitting antenna 52 to antenna arrays 2 and is received by element antennas 1. The output from each receiver 10 is input to a corresponding correction data setting means 53 which detects an amount of change in amplitude and/or phase characteristics of the receiving path and sets optimum correction data in correction data storing means 42 on the basis of the detected amount of change.

FIG. 6B shows the construction of the k-th correction data setting means 53 connected between the k-th receiver and correction means 41. The initial value of the correction data $\rho_1(k,0)$ is stored in the first storing means 61 and a reference value $\rho_2(k,0)$ to be used when modifying the correction data is stored in the second storing means 62. The reference value $\rho_2(k,0)$ is divided by the output of k-th receiver 10 by complex division means 63, the output of which is multiplied by the initial value $\rho_1(k,0)$ by complex multiplication means 64.

In operation, an RF signal received by each element antenna 1 is converted to the digital complex video signal by receiver 10. The complex digital video signal is corrected, as described above, in amplitude and/or phase by correction means 41 and then fed to multiple-beam forming means 11.

The correction data used to correct the amplitude and/or phase characteristics of the complex digital video signal is updated by correction data setting means 53 such that the correction data are set to suppress the amplitude and/or phase errors that have occurred due to a change in the amplitude and/or phase characteristics of each receiving path as a result of any change in temperature or the like. For example, in order to update the correction data at regular intervals while the antenna system is being operated, the correction data are renewed for every period between the adjacent transmit/receive periods.

The renewal of correction data is done in a manner such as that described below. The antenna system in the initial condition, i.e., wherein there is no change in the amplitude and/or phase characteristics of each receiving path, is illuminated by a planar wave coming from the direction normal to antenna array 2, that is, an RF signal impinging on the respective element antennas in phase. In this state, the output $\rho_1(k,0)$ is obtained by the k-th receiver and calculation is executed to obtain $\rho_1^*(k,0)/|\rho_1^*(k,0)|$ which is stored in first storing means 61 as the initial value of the correction data. Then transmitter 51 generates the test wave and sends it to the antenna system in the initial condition. Element antennas 1 receive the test wave to cause receivers 10 to produce an output. The output from the k-th receiver is $\rho_2(k,0)$ which is the reference value that serves as a standard for determining the amount of any change in the amplitude and/or phase characteristics of the k-th receiving path. At the intervals for updating the correction data while the antenna system is in operation, transmitting antenna 52 sends the test wave to cause the k-th receiver to produce the output $\rho_2(k,t)$. The difference between $\rho_2(k,t)$ and $\rho_2(k,0)$ corresponds to the change in amplitude and/or phase characteristics of the k-th receiving path. In k-th correction data setting means 53 shown in FIG. 6B, the receiver output $\rho_2(k,t)$ is input to complex division means 63 which divides the reference value $\rho_2(k,0)$ in second storing means 62 by the receiver output $\rho_2(k,t)$ to output $\rho_2(k,0)/\rho_2(k,t)$ which corresponds to the amount of change. Complex multiplication means 64 multiplies the output from complex division means 63 by the value $\rho_1^*(k,0)/|\rho_1^*(k,0)|$ from first storing means 61. The resultant value $\{\rho_1^*(k,0)/|\rho_1^*(k,0)|\}\cdot\{\rho_2(k,0)/\rho_2(k,t)\}$ is supplied to correction data storing means 41 as new correction data for the renewal of correction data. Thus correction data $\rho_1(k,0)$ suitable for the required amplitude and/or phase characteristics correction are obtained and expressed by the following equation:

$$\rho_1(k, t) = \frac{\rho_1^*(k, 0)}{|\rho_1^*(k, 0)|} \cdot \frac{\rho_2(k, 0)}{\rho_2(k, t)} \qquad (13)$$

The beam forming output created by the digital complex video signal which has been corrected by the correction data expressed by equation (13) is given as follows:

$$B_r = \sum_{k=-N/2}^{N/2-1} W_k \cdot \sigma(k) \frac{\rho_1^*(k, 0)}{|\rho_1^*(k, 0)|} \cdot \frac{\rho_2(k, 0)}{\rho_2(k, t)} \cdot \qquad (14)$$

$$\exp\left\{-j\left(\frac{2\pi}{N}\right)k \cdot r\right\} \qquad (11)$$

In this way, not only the amplitude and/or phase errors of the respective receiving paths due to irregularities in the path lengths and parts can be corrected, but also changes in amplitude and/or phase characteristics of element antennas 1 and receivers 10 due to changes in temperature can be compensated for by updating the correction data on the basis of the amount of the change in amplitude and/or phase errors. Accordingly, optimum correction data can always be set to correct the amplitude and/or phase errors, thereby enabling accurate and stable multiple beams to be formed.

The present invention has been described in detail with reference to certain preferred embodiments thereof, but it will be understood that variations and modifications can be effected within the spirit and scope of the invention.

What is claimed is:

1. A holographic multiple-beam antenna system capable of forming a plurality of beams at one time in different directions, comprising:

an antenna array having a plurality of element antennas arranged in a predetermined configuration;

a plurality of receiver means each connected to the corresponding one of said element antennas for phase-detecting the signal received by said corresponding element antenna so as to output a digital complex signal which includes amplitude information and phase information;

a plurality of correction means each adapted to receive the digital complex signal output from the corresponding receiver means and operable to correct the received digital complex signal on the basis of correction data preset in accordance with changes in characteristics of amplitude and/or phase that have occurred in the receiving path from said element antenna to said receiver means corresponding thereto, thereby removing the amplitude and/or phase errors from the digital complex signal; and multiple-beam forming means adapted to receive the corrected digital complex signals output from said plurality of correction means and to perform signal processing for forming a plurality of beams, whereby amplitude and/or phase errors occurring in the receiving paths are removed from the digital complex signals to enable highly accurate beams to be formed.

2. Antenna system as set forth in claim 1, wherein said digital complex signals are digital complex video signals, and wherein each of said correction means comprises:

memory means for storing the correction data; and multiplying means adapted to receive the digital complex video signal from said receiver means and the correction data from said memory means and to obtain the product thereof which in turn is output to said multiple-beam forming means.

3. Antenna system as claimed in claim 2, wherein each of said receiver means comprises:

phase detector means including an oscillator which generates a coherent signal and operable to phase-detect the received signal of the corresponding element antenna by using the coherent signal to output a complex video signal including amplitude information and phase information; and A/D conversion means for converting the complex video signal to a digital complex video signal which in turn is fed to said multiplying means.

4. A holographic multiple-beam antenna system capable of forming a plurality of beams at one time in different directions, comprising:

an antenna array having a plurality of element antennas;

a plurality of receiver means each connected to the corresponding one of said element antennas for phase-detecting the signal received by the corresponding element antenna so as to output a digital complex signal which includes amplitude information and phase information;

a plurality of correction means each adapted to receive the digital complex signal output from the corresponding receiver means and operable to correct the received digital complex signal on the basis of correction data preset in accordance with changes in characteristics of amplitude and/or phase that have occurred in the receiving path from said element antenna to said receiver means corresponding thereto, thereby removing the amplitude and/or phase errors from the digital complex signal;

multiple-beam forming means adapted to receive the corrected digital complex signals output from said plurality of correction means and to perform signal processing for forming a plurality of beams, whereby the amplitude and/or phase errors occurring in the receiving paths are removed from the digital complex signals to enable highly accurate beams to be formed;

transmission means capable of transmitting a test wave to said antenna array at a predetermined time; and setting means operable to detect the amplitude and/or phase characteristics of the respective receiving paths on the basis of the digital signals output from the respective element antennas when they receive the test wave so as to cause correction data corresponding to the detected characteristics of the receiving paths to be set in the respective correction means, whereby the amplitude and/or phase errors occurring in the receiving paths are removed from the digital complex signals to enable highly accurate beams to be formed.

5. Antenna system as set forth in claim 4, wherein said digital complex signals are digital complex video signals, and wherein said correction means comprises:

memory means for storing the correction data; and multiplying means adapted to receive the digital complex video signal from said receiver means and the correction data from said memory means and to obtain the product thereof which in turn is output to said multiple-beam forming means.

6. Antenna system as claimed in claim 5, wherein said setting means comprises:

first memory means for storing the initial values of the respective correction data;

second memory means for storing reference values used for obtaining changes in the characteristics of amplitude and/or phase of the respective receiving paths;

dividing means for obtaining the quotients of the digital complex video signals to the reference values and adapted to output correction values corresponding to the changes in the characteristics of amplitude and/or phase of the receiving paths; and multiplying means for obtaining the products of the initial values and the correction values and adapted to supply the products to the corresponding correction means for updating.

7. Antenna system as claimed in claim 6, wherein each of said receiver means comprises:

phase detector means including an oscillator for generating a coherent signal and operable to phase-detect the signal received by the corresponding element antenna by utilizing the coherent signal to output the complex video signal including amplitude information and phase information; and A/D conversion means for converting the complex video signal to a digital complex video signal which in turn is fed to said multiplying means.

* * * * *